June 12, 1962  T. J. CAVES  3,038,257
GRASS SHEARS
Filed Feb. 13, 1961

INVENTOR.
THOMAS J. CAVES
BY
WILSON, SETTLE & CRAIG
ATTORNEYS

United States Patent Office

3,038,257
Patented June 12, 1962

3,038,257
GRASS SHEARS
Thomas J. Caves, 6952 Town Lane, Dearborn, Mich.
Filed Feb. 13, 1961, Ser. No. 88,749
4 Claims. (Cl. 30—248)

The present invention relates to grass shears and more particularly to grass shears having one movable blade and one fixed blade.

An object of the invention is to provide grass shears having one fixed blade and one movable blade whereby the shears may be utilized to clip the borders of lawns with the fixed blade sliding against a structure such as a driveway or fence adjacent the edge of the lawn to thus permit clipping the entire edge portions of the lawn.

Another object of the invention is to provide a simplified structure having a movable handle directly connected to the movable blade without the necessity of linkage therebetween.

A further object of the invention is to provide means for maintaining the blade shearing edges in proper cutting relationship for excellent shearing action.

A still further object of the invention is to provide cam means on the movable handle to apply a constant force to the movable blade through the medium of a resilient member to thereby maintain the movable and fixed blades in proper cutting relationship.

Other objects of this invention will appear in the following description and appended claims, reference being had to the accompanying drawings forming a part of this specification wherein like reference characters designate corresponding parts in the several views.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Figure 1:
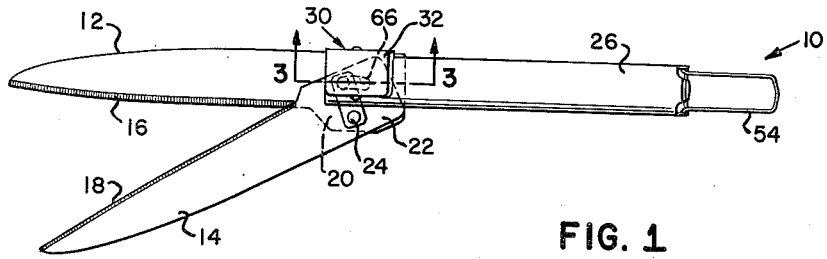
FIGURE 1 is a top plan view of one embodiment of the grass shears of the present invention.
Figure 2:
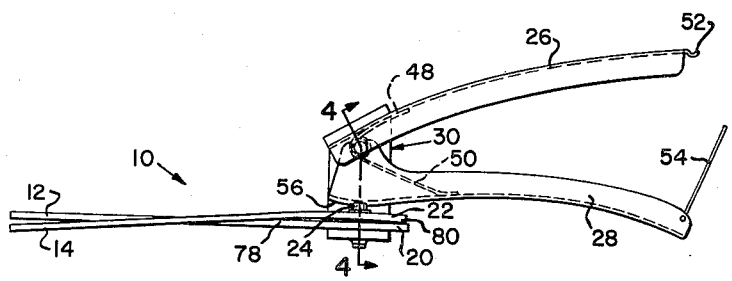
FIGURE 2 is a side elevational view of the grass shears of FIGURE 1.

As will be noted in FIGURES 1 and 2, the shears 10 comprise a lower fixed blade 12 and an upper movable blade 14. The blades have inner shearing edges 16, 18 to perform the usual scissor action for clipping grass. Each of the blades is provided with an enlarged rear end portion 20, 22. The blades are pivotally attached at their enlarged rear end portions by means of pin 24.

Figure 4:
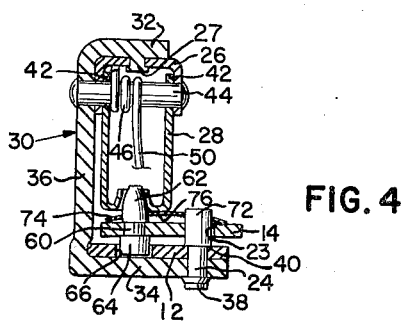
FIGURE 4 is a sectional view taken substantially along the line 4—4 of FIGURE 2 looking in the direction of the arrows further illustrating the pivotal connection between the movable handle and movable blade.

The blades are provided with fixed handle 26 and movable handle 28 positioned therebeneath. The fixed handle has secured thereto at its forward end a downwardly inclined bracket 30. The bracket 30 has an inwardly directed upper leg 32 which is riveted to the handle 26 by upset stud 27 which projects through an opening in the handle as shown in FIGURE 4. A lower inwardly directed leg 34 is provided at the lower end of web 36 and is secured to the blade 12 by means of pin 24 which is upset at 38 and has a shoulder 40 to rivet the parts together.

The handles 26, 28 are channel sections and the movable handle has ears 42 at its forward end which are inserted into the channel portion at the forward end of the fixed handle 26. The handles are pivotally secured together in this position by a pin 44. Torsion spring 46 is mounted on the pin 44 and has arms 48, 50 which are sprung outwardly against the handles 26, 28 to bias these handles apart as shown in FIGURE 2. A hook 52 is provided at the rearward end of the handle 26 for engagement with a U-shaped latch 54 which is pivotally mounted at the rearward end of the handle 28. The latch is engageable with the hook to hold the blades in the closed position and prevent movement thereof when the shears are stored.

The movable handle 28 is provided with a curved lower surface 56 at its forward end. The surface 56 has an opening 58 which receives upwardly extending portion 62 of rivet 60. The rivet 60 extends through an opening in the movable blade 14 and has a downwardly extending portion 64 which extends into a longitudinally extending curved slot 66 provided in the fixed blade 12.

Figure 5:
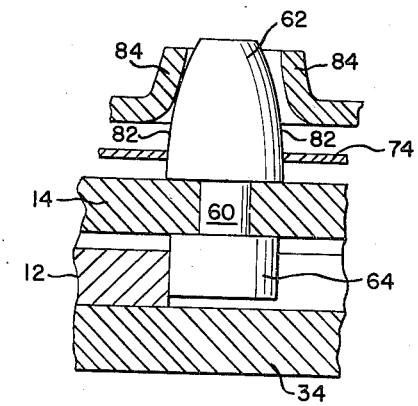
FIGURE 5 is an enlarged sectional view of the pin and opening providing connection between the movable handle and movable blade.
Figure 3:
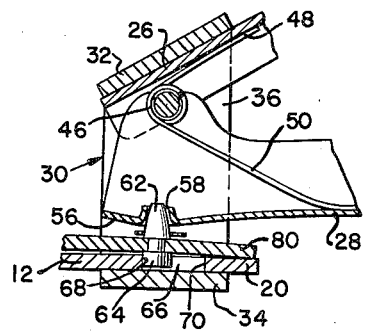
FIGURE 3 is a sectional view taken substantially along the line 3—3 of FIGURE 1 looking in the direction of the arrows and showing the driving connection between the movable handle and the movable blade.

As shown in FIGURE 5, the outer surface 82 of rivet portion 62 is formed in the shape of an involute gear tooth. The opening 58 is provided with an upwardly extending annular wall 84, the inner surface of which is also shaped with a tooth contour to mate with tooth 62. This arrangement provides a rack-and-pinion engagement of tooth 62 with wall 84.

In operation, when the movable handle 28 is moved towards the fixed handle 26, the sides of opening 58 engage the tooth portion 62 in a rolling gear action to pivot the movable blade 14 about pin 24 in the usual pivot action. It will be noted that the opening 58 is slightly larger than the portion 62 to prevent these parts from binding during pivoting. The lower portion 64 of rivet 60 rides in the slot 66 during shearing and abuts against the forward and rearward ends 68, 70 of the slot to limit movement of the blade 14.

The pin 24 extends above the blade 14 at 72 and a flat spring 74 extends between the pins 24, 60 transversely of the blades. The spring 74 is bowed upwardly and contacts a portion of the curved surface 56 at 76. This contact permits the curved surface to apply yielding pressure to the rearward end of the blade 14 during pivoting of the blade. As the blade is pivoted, the surface 56 acts as a cam and slides along the spring to maintain the pressure constant. This pressure keeps proper shearing contact between the blade edges 16, 18.

The contact point of the edges 16, 18 advances from the rearward end of the blades to the forward end during pivoting of the movable blade. As will be noted in FIGURE 2, before the handles are squeezed together, the shearing edges touch at point 78. As is conventional, the forward end of blade 14 cants downwardly to a position beneath the forward end of the fixed blade 12. During pivoting, the blade 14 rises slightly on the pin 24 to permit the forward end thereof to rise as the contact point moves forwardly. As will be noted in FIGURE 4, the opening 23 is larger than the head of pin 24 to permit rising of the rear end of blade 14. Establishment of correct shearing contact of the blade edges is also assisted by the downturned end 80 of movable blade 14 which always contacts the upper surface of the rear end 20 of the fixed blade. This contact prevents wobble between the blades during shearing.

Having thus described my invention, I claim:

1. Grass shears comprising a lower fixed blade and an upper movable blade; said blades having inner shearing edges; means pivotally attaching the blades together at their rear end portions; a fixed handle having downwardly inclined forward end section fixed to the rear end portion of the fixed blade; a movable handle pivotally secured to the fixed handle and positioned therebeneath; said movable handle having a longitudinally disposed curved lower surface at its forward end with an opening therein; a pin extending upwardly from the rear end portion of the movable blade into engagement with the opening in the curved surface of the movable handle; whereby relative pivoting of the handles is effective, via the engaged pin and curved surface, to cause relative pivoting of the blades.

2. Grass shears comprising a lower fixed blade and an upper movable blade; said blades having inner shearing edges; means pivotally attaching the blades together at their rear end portions; a fixed handle having a downwardly inclined forward end section fixed to the rear end portion of the fixed blade; a movable handle pivotally secured to the fixed handle and positioned therebeneath; said movable handle having a longitudinally disposed curved lower surface at its forward end with an opening therein; a gear-tooth shaped wall extending upwardly from said opening; a gear-tooth shaped pin extending upwardly from the rear end portion of the movable blade into engagement with said gear-tooth shaped wall; whereby relative pivoting of the handles is effective, via the engaged pin and wall, to cause relative pivoting of the blades.

3. Grass shears comprising a lower fixed blade and an upper movable blade; said blades having inner shearing edges; means pivotally attaching the blades together at their rear end portions; a fixed handle having downwardly inclined forward end section fixed to the rear end portion of the fixed blade; a movable handle pivotally secured to the fixed handle and positioned therebeneath; said movable handle having a longitudinally disposed curved lower surface at its forward end with an opening therein; said fixed blade having a longitudinally extending slot in the rear end portion thereof; a first pin structure extending upwardly from the rear end portion of the movable blade into engagement with the opening in the curved surface of the movable handle; and a second pin structure extending downwardly from the rear end portion of the movable blade into said slot in the fixed blade; whereby relative pivoting of the handles is effective, via said engaged upwardly extending first pin structure and curved surface, to cause relative pivoting of the blades, the extent of blade pivoting being defined by the length of said slot in the fixed blade.

4. Grass shears comprising a lower fixed blade and an upper movable blade; said blades having inner shearing edges; means pivotally attaching the blades together at their rear end portions; a fixed handle having downwardly inclined forward end section fixed to the rear end portion of the fixed blade; a movable handle pivotally secured to the fixed handle and positioned therebeneath; said movable handle having a longitudinally disposed curved lower surface at its forward end with an opening therein; a pin extending upwardly from the rear end portion of the movable blade into engagement with the opening in the curved surface of the movable handle; an upwardly bowed flat spring secured to the movable blade beneath said curved movable handle surface and in pressure contact therewith; whereby relative pivoting of the handles will rotate said curved surface to cause relative pivoting of the blades with a scissor action; said curved surface being at all times in pressure contact with said spring to maintain the shearing edges of the blades in cutting contact.

References Cited in the file of this patent

UNITED STATES PATENTS

| | | |
|---|---|---|
| 1,618,817 | Dooley | Feb. 22, 1927 |
| 2,853,777 | Alofs | Sept. 30, 1958 |